(12) United States Patent
Fujiwara et al.

(10) Patent No.: US 10,928,004 B2
(45) Date of Patent: Feb. 23, 2021

(54) THRESHOLD VALUE CALCULATION SYSTEM, AND THRESHOLD VALUE CALCULATION METHOD

(71) Applicant: TLV Co., Ltd., Kakogawa (JP)

(72) Inventors: Yoshiyasu Fujiwara, Kakogawa (JP); Kazunori Oda, Kakogawa (JP); Yoshio Miyamae, Kakogawa (JP); Hiroki Kawahara, Kakogawa (JP)

(73) Assignee: TLV Co., Ltd., Kakogawa (JP)

(*) Notice: Subject to any disclaimer, the term of this patent is extended or adjusted under 35 U.S.C. 154(b) by 311 days.

(21) Appl. No.: 15/564,230

(22) PCT Filed: Feb. 19, 2016

(86) PCT No.: PCT/JP2016/054902
§ 371 (c)(1),
(2) Date: Oct. 4, 2017

(87) PCT Pub. No.: WO2016/163163
PCT Pub. Date: Oct. 13, 2016

(65) Prior Publication Data
US 2018/0128424 A1 May 10, 2018

(30) Foreign Application Priority Data

Apr. 7, 2015 (JP) .............................. JP2015-078440

(51) Int. Cl.
*F16T 1/48* (2006.01)
*G05B 23/02* (2006.01)
*G05B 23/00* (2006.01)

(52) U.S. Cl.
CPC ................ *F16T 1/48* (2013.01); *G05B 23/00* (2013.01); *G05B 23/02* (2013.01)

(58) Field of Classification Search
CPC ....... F16T 1/48; G05B 23/00; G05B 23/0221; G05B 2219/24093; G05B 17/02; G05B 23/02; F01K 13/006; F01K 13/02
(Continued)

(56) References Cited

U.S. PATENT DOCUMENTS 4,705,212 A * 11/1987 Miller ....................... F16T 1/00
137/171
5,027,293 A * 6/1991 Pung ....................... G07C 3/00
271/202

(Continued)

FOREIGN PATENT DOCUMENTS

EP 0972982 A2 1/2000
EP 1203910 A2 5/2002
(Continued)

*Primary Examiner* — John E Breene
*Assistant Examiner* — Jeffrey P Aiello
(74) *Attorney, Agent, or Firm* — The Webb Law Firm

(57) ABSTRACT

The present invention includes a threshold value calculation unit that calculates a normal range that is a range of values that are taken when a steam trap is in a normal state, by using a predetermined calculation reference, based at least on state values with normal determination results, from among state values that have been stored in the storage unit during a predetermined period. A determination unit can perform predictive determination to determine whether the steam trap is in a normal state or a state that indicates an inclination toward a bad state and is highly likely to change to a bad state, by determining whether or not the state values are in the normal range, and the threshold value calculation unit performs accuracy determination to determine the accuracy of the predictive determination based on the results of the predictive determination regarding the state values stored in the storage unit, and adjusts the calculation reference based on the result of accuracy determination.

3 Claims, 5 Drawing Sheets

(58) Field of Classification Search
USPC ......... 340/603; 700/1, 286, 287; 702/34, 35, 702/182, 183
See application file for complete search history.

(56) References Cited

U.S. PATENT DOCUMENTS

| | | | |
|---|---|---|---|
| 6,332,112 | B1 | 12/2001 | Shukunami et al. |
| 6,571,180 | B1* | 5/2003 | Turner ..................... F16T 1/48 702/182 |
| 7,103,460 | B1* | 9/2006 | Breed ................. B60C 23/0408 701/29.1 |
| 2002/0052716 | A1 | 5/2002 | Fujiwara |
| 2008/0249744 | A1* | 10/2008 | Fujiwara ............ G05B 23/0254 702/183 |
| 2009/0044042 | A1 | 2/2009 | Fujiwara et al. |
| 2009/0216495 | A1 | 8/2009 | Fujiwara et al. |
| 2009/0228121 | A1 | 9/2009 | Fujiwara et al. |
| 2010/0153068 | A1 | 6/2010 | Armstrong et al. |
| 2011/0234418 | A1* | 9/2011 | Liao ......................... F16T 1/48 340/679 |
| 2011/0263257 | A1* | 10/2011 | Kago ................ H04W 36/0083 455/436 |
| 2013/0167619 | A1 | 7/2013 | Spasova |
| 2013/0167783 | A1 | 7/2013 | Poczka et al. |
| 2013/0173178 | A1 | 7/2013 | Poczka et al. |
| 2014/0090712 | A1 | 4/2014 | Karschnia et al. |

FOREIGN PATENT DOCUMENTS

| | | |
|---|---|---|
| EP | 1914688 A1 | 4/2008 |
| GB | 2189321 A | 10/1987 |
| GB | 2498082 A | 7/2013 |
| JP | 1074188 A | 3/1998 |
| JP | 200020866 A | 1/2000 |
| JP | 2003343794 A | 12/2003 |

* cited by examiner

Fig.3

○○○, INC.　△△△FACTORY　TO WHOM IT MAY CONCERN

THE FOLLOWING ARE TODAY'S RESULTS OF TRAP OPERATION DETERMINATION.
YESTERDAY'S RESULTS ARE SHOWN IN PARENTHESES.

NUMBER OF MEASUREMENT LOCATIONS　77(77)
　　CLOGGING: 1, INCLUDING 0 CONFIRMED (0, INCLUDING 0 CONFIRMED)
　　LEAKAGE: 1, INCLUDING 0 CONFIRMED (0, INCLUDING 0 CONFIRMED)
SUSPENSION : 51(51)

LOCATIONS OF CLOGGING

\*\*\*\*\*\*\*, □□□□

LOCATIONS OF LEAKAGE

\*\*\*\*\*\*\*, □□□□

LOCATIONS WHERE THERE IS POSSIBILITY OF CLOGGING
\*\*\*\*\*\*\*, □□□□
\*\*\*\*\*\*\*, □□□□
\*\*\*\*\*\*\*, □□□□
\*\*\*\*\*\*\*, □□□□
\*\*\*\*\*\*\*, □□□□
\*\*\*\*\*\*\*, □□□□
\*\*\*\*\*\*\*, □□□□
\*\*\*\*\*\*\*, □□□□
\*\*\*\*\*\*\*, □□□□

LOCATIONS WHERE PREPARATIONS FOR TRAP REPLACEMENT ARE REQUIRED
\*\*\*\*\*\*\*, □□□□
\*\*\*\*\*\*\*, □□□□

THANK YOU

Fig.4

○○○, INC.　△△△FACTORY　　TO WHOM IT MAY CONCERN

THE FOLLOWING ARE TOMORROW'S PREDICTED RESULTS OF TRAP OPERATION DETERMINATION.
TODAY'S RESULTS ARE SHOWN IN PARENTHESES.

NUMBER OF MEASUREMENT LOCATIONS : 73(73)
　　CLOGGING: 2, INCLUDING 1 CONFIRMED (1, INCLUDING 1 CONFIRMED)
　　LEAKAGE: 2, INCLUDING 0 CONFIRMED (0, INCLUDING 0 CONFIRMED)
SUSPENSION : 49(49)

LOCATIONS OF CLOGGING

\*\*\*\*\*\*, □□□□
\*\*\*\*\*\*, □□□□

LOCATIONS OF LEAKAGE

\*\*\*\*\*\*, □□□□
\*\*\*\*\*\*, □□□□

THANK YOU

Fig.5

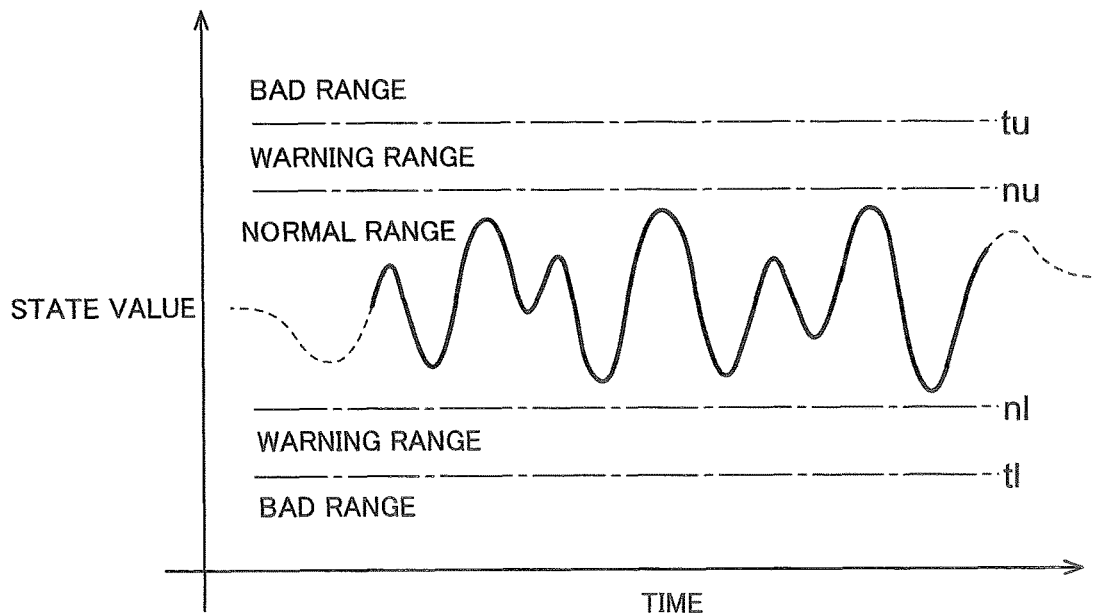

THRESHOLD VALUE CALCULATION SYSTEM, AND THRESHOLD VALUE CALCULATION METHOD

CROSS-REFERENCE TO RELATED APPLICATIONS

This application is the United States national phase of International Application No. PCT/JP2016/054902 filed Feb. 19, 2016, and claims priority to Japanese Patent Application No. 2015-078440 filed Apr. 7, 2015, the disclosures of which are hereby incorporated in their entirety by reference.

TECHNICAL FIELD

The present invention relates to a threshold value calculation system and a threshold value calculation method for calculating threshold values that are used to determine the state of a steam trap.

BACKGROUND ART

Generally, to determine the state of a steam trap, an upper limit value, a lower limit value, or both of them are set for a determination-target physical amount (e.g., the temperature, ultrasonic waves, or the like), and the state is determined as being a bad state if the determination-target physical amount is higher than the upper limit value or lower than the lower limit value (a range above the upper limit value or a range below the lower limit value is referred to as a bad range, for example). Note that a determination-target physical amount is not a constant value and varies over time even if a steam trap is in a normal state. The range of values that can be taken when a steam trap is in a normal state (referred to as a normal range, for example) is determined to some extent. There are no problems when the determination-target physical amount falls within the normal range. However, it can be said that, when the determination-target physical amount is out of the normal range, even if the determination-target physical amount is not in a bad range, the state of the steam trap is highly likely to change to a bad state.

Based on this fact, it may be possible to quickly detect that a steam trap comes into a bad state, by setting the upper limit and/or the lower limit of the normal range as threshold value(s), and determining whether or not the determination-target physical amount is within the normal range (referred to as predictive determination, for example). Note that this normal range varies for each steam trap depending on the purpose of the steam trap (e.g. the type of apparatus or facility where the trap is installed in relation thereto, and the pressure and temperature of steam employed in a plant). For example, Patent Document 1 discloses, as a method for setting threshold values of such a normal range, a method by which data of each steam trap is collected during an initial operation period of each steam trap, and the upper limit value and the lower limit value of the normal range are set as threshold values for each steam trap, based on the collected data.

PRIOR ART DOCUMENTS

Patent Documents

Patent Document 1: US 2010/153068A1

SUMMARY

However, according to the method disclosed in Patent Document 1 above, in the case that a steam trap comes into a bad state during an initial operation period in which data for setting the normal range is collected, or, a steam trap has a defect or is in an environment where the steam trap cannot properly operate from the beginning, it is impossible to set an appropriate normal range. Although the normal range can be calculated using the collected data based on a calculation reference, the normal range varies for each steam trap, depending on the purpose of the steam trap. Therefore, if the normal range is calculated based on the same calculation reference for each steam trap, the accuracy of predictive determination varies for each steam trap, and there is the risk of the accuracy of predictive determination being insufficient for some steam traps. To perform accurate determination, it is preferable that a calculation reference for calculating the normal range is appropriately set for each steam trap. However, such an idea is not taken into consideration in Patent Document 1 above.

Therefore, there is demand for a threshold value calculation system and a threshold value calculation method that can appropriately set a calculation reference for calculating a normal range, and perform accurate predictive determination for each steam trap.

Characteristic configurations of a threshold value calculation system according to the present disclosure lie in that the threshold value calculation system includes:

a detector configured to detect one or more physical amounts regarding a steam trap;

a determination unit configured to perform bad state determination to determine whether the state of the steam trap is a normal state or a bad state by determining whether or not state values that are based on detection signals have come into a bad range of the state values;

a storage unit configured to cumulatively store the state values and determination results of the bad state determination; and a threshold value calculation unit configured to calculate a normal range that is a range of values that are taken when the steam trap is in a normal state, by using a predetermined calculation reference, based at least on state values with normal determination results, from among the state values that have been stored in the storage unit during a predetermined period, wherein the determination unit is configured to be able to perform predictive determination to determine whether the steam trap is in a normal state or a state that indicates an inclination toward a bad state and is highly likely to change to a bad state, by determining whether or not the state values are in the normal range, and the threshold value calculation unit is configured to perform accuracy determination to determine the accuracy of the predictive determination based on the results of the predictive determination regarding the state values stored in the storage unit, and adjust the calculation reference based on the result of accuracy determination.

With this configuration, when the normal range for determination-target state values is set, not only state values, but also the determination results regarding the state of the steam trap based on the state values are cumulatively stored, and the normal range is calculated based on a predetermined calculation reference, using only the state values that have been determined as indicating that the steam trap is in a normal state. As a result, it is possible to appropriately set the normal range. Furthermore, after the normal range is calculated based on the predetermined calculation reference, predictive determination that is based on the calculated normal range is performed to determine the accuracy, using state values that were not used to calculate the normal range as well (e.g. state values that are older than the state values that were used to set the normal range). The threshold value calculation unit performs accuracy determination to determine the accuracy of predictive determination, based on the result of predictive determination. Then, the calculation reference is adjusted based on the accuracy determination. Therefore, the calculation reference can be adjusted so that the accuracy of predictive determination regarding a steam trap for which the accuracy is insufficient becomes sufficient. Thus, it is possible to appropriately set the normal range, and it is possible to perform accurate predictive determination on each steam trap.

Here, the state value is a concept that includes not only a value that indicates a given physical amount detected by a detector, but also a value that indicates a combination of a plurality of detected physical amounts (e.g. a value obtained by summing a plurality of weighted physical amounts). Also, it is not essential that only one kind of state values is subjected to determination, and determination may be performed on multiple kinds of state values, or on a combination of the value and the inclination of a state value.

Further characteristic configurations of the threshold value calculation system according to the present disclosure lie in that the threshold value calculation unit is configured to perform the accuracy determination by comparing the results of the predictive determination regarding the state values, with the results of bad state determination regarding state values that have been obtained during a predetermined period after the state values on which the predictive determination has been performed were detected, to determine whether the predictive determination is correct or incorrect.

When the result of predictive determination indicates a normal state, the steam trap should remain in the normal state thereafter, and when the result of predictive determination indicates an inclination toward a bad state, the steam trap may come into a bad state thereafter, if predictive determination has been properly performed. Therefore, with this configuration, accuracy determination is performed by comparing the result of the predictive determination regarding the state values of the steam traps at a given point in time, with the results of bad state determination regarding state values that have been obtained during a predetermined period after the state values on which the predictive determination has been performed were detected, from among the results of bad state determination stored in the storage unit, to determine whether the predictive determination is correct or incorrect. That is, by determining whether or not the states of the steam traps predicted based on the results of predictive determination are the same as the states of the steam traps that are actually detected, it is possible to accurately perform accuracy determination, which is performed to determine the accuracy of the predictive determination. Thus, it is possible to more appropriately set the normal range, and it is possible to perform more accurate predictive determination on each steam trap.

Further characteristic configurations of the threshold value calculation system according to the present disclosure lie in that the threshold value calculation unit is configured to perform the accuracy determination based on: a first index that indicates the ratio, relative to all of the results of correctness determination regarding predictive determination, of cases in which the result of predictive determination indicates a normal state, and the results of bad state determination regarding state values obtained during the predetermined period thereafter include a result determined as indicating a bad state; a second index that indicates the ratio, relative to all of the results of correctness determination regarding predictive determination, of cases in which the result of predictive determination indicates a state indicating an inclination toward a bad state, and the results of bad state determination regarding state values obtained during the predetermined period thereafter do not include a result indicating a bad state; or a third index that is a combination of the first index and the second index.

That is, cases of incorrect predictive determination are composed of cases in which a bad state could not be predicted (i.e. cases related to the first index, in which the result of predictive determination indicates a normal state, but the results of the bad state determination performed thereafter include a result determined as indicating a bad state) and cases in which it was unnecessarily determined that the state is a state indicating an inclination toward a bad state and unnecessary countermeasures will be performed (i.e. cases related to the second index, in which the result of predictive determination indicates a state indicating an inclination toward a bad state, but the results of the bad state determination performed thereafter do not include a result determined as indicating a bad state). Also, the sum of the ratio of the cases in which it was unable to predict a bad state and the ratio of the cases in which unnecessary countermeasure will be taken is the ratio of all of the cases in which misdetection was caused (related to the third index). The reference for accuracy determination can be selected from the following according to a maintenance policy regarding steam traps. That is, it is possible to (1) use the above-described first index as the reference to reduce cases in which a bad state could not be predicted, (2) use the above-described second index as the reference to reduce cases in which unnecessary countermeasures will be performed, and (3) use the above-described third index as the reference to reduce the number of cases of incorrect predictive determination.

With the above-described configuration, it is possible to appropriately adjust the calculation reference for calculating the normal range so as to match one of the above-described maintenance policies by performing accuracy determination using one of the first index, the second index, and the third index. Therefore, it is possible to set an appropriate normal range according to a maintenance policy regarding steam traps. Thus, it is possible to more appropriately set the normal range, and it is possible to perform more accurate predictive determination on each steam trap.

Here, the concept of combining the first index and the second index includes not only a simple sum of these indices, but also a value obtained by summing the indices after assigning a weight to either one or both of them, for example.

Further characteristic configurations of the threshold value calculation system according to the present disclosure lie in that the threshold value calculation system includes an instruction input unit, and the threshold value calculation unit is configured to switch between the first index, the second index, and the third index, based on which the accuracy determination is performed on each steam trap, based on an instruction from the instruction input unit.

That is, with this configuration, it is possible to switch between the first index, the second index, and the third index, based on which the accuracy determination is performed. Therefore, it is possible to switch the reference for accuracy determination according to the importance or purpose of the steam trap, and flexibly set the normal range according to a maintenance policy regarding steam traps. Thus, it is possible to more appropriately set the normal range, and it is possible to perform more accurate predictive determination on each steam trap.

Characteristic configurations of a threshold value calculation method according to the present disclosure lie in that the threshold value calculation method includes:

detecting one or more physical amounts regarding a steam trap;

performing bad state determination to determine whether the state of the steam trap is a normal state or a bad state by determining whether state values that are based on detection signals have come into a bad range of the state values;

cumulatively storing state values and determination results of the bad state determination;

calculating a normal range that is a range of values that are taken when the steam trap is in a normal state, by using a predetermined calculation reference, based at least on state values with normal determination results, from among the state values that have been stored in the storage unit during a predetermined period;

performing predictive determination to determine whether the steam trap is in a normal state or a state that indicates an inclination toward a bad state and is highly likely to change to a bad state, by determining whether or not the state values stored in the storage unit are in the normal range; and performing accuracy determination to determine the accuracy of the predictive determination based on the results of the predictive determination, and adjusting the calculation reference based on the result of accuracy determination.

With the above-described configuration, it is possible to desirably implement the threshold value calculation system according to the present disclosure, and thus it is possible to effectively achieve the above-described effects that can be obtained using the threshold value calculation system according to the present disclosure.

BRIEF DESCRIPTION OF THE DRAWINGS

FIG. 3 is a diagram showing an example of maintenance information.

FIG. 4 is a diagram showing an example of predictive information.

FIG. 5 is a diagram showing an example of a temporal change in the state of a steam trap.

EMBODIMENTS

The following describes a threshold value calculation system and a threshold value calculation method according to the present disclosure with reference to the drawings. A threshold value calculation system according to the present embodiment includes: a determination unit configured to perform bad state determination to determine whether the state of the steam trap is a normal state or a bad state by determining whether or not state values that are based on detection signals have come into a bad range of the state values; a storage unit configured to cumulatively store the state values and determination results of the bad state determination; and a threshold value calculation unit configured to calculate a normal range that is a range of values that are taken when the steam trap is in a normal state, by using a predetermined calculation reference, based at least on state values with normal determination results, from among the state values that have been stored in the storage unit during a predetermined period. In the threshold value calculation system according to the present embodiment, the determination unit is configured to be able to perform predictive determination to determine whether the steam trap is in a normal state or a state that indicates an inclination toward a bad state and is highly likely to change to a bad state, by determining whether or not the state values are in the normal range, and the threshold value calculation unit is configured to perform accuracy determination to determine the accuracy of the predictive determination regarding the state values stored in the storage unit, and adjusts the calculation reference based on the result of accuracy determination. With this configuration, it is possible to accurately set a normal range that allows for accurate determination for each steam trap. The following describes the details of a threshold value calculation system (a threshold value calculation method) according to the present embodiment by describing an example in which a threshold value calculation system according to the present embodiment is built into a maintenance support system.

Figure 1:
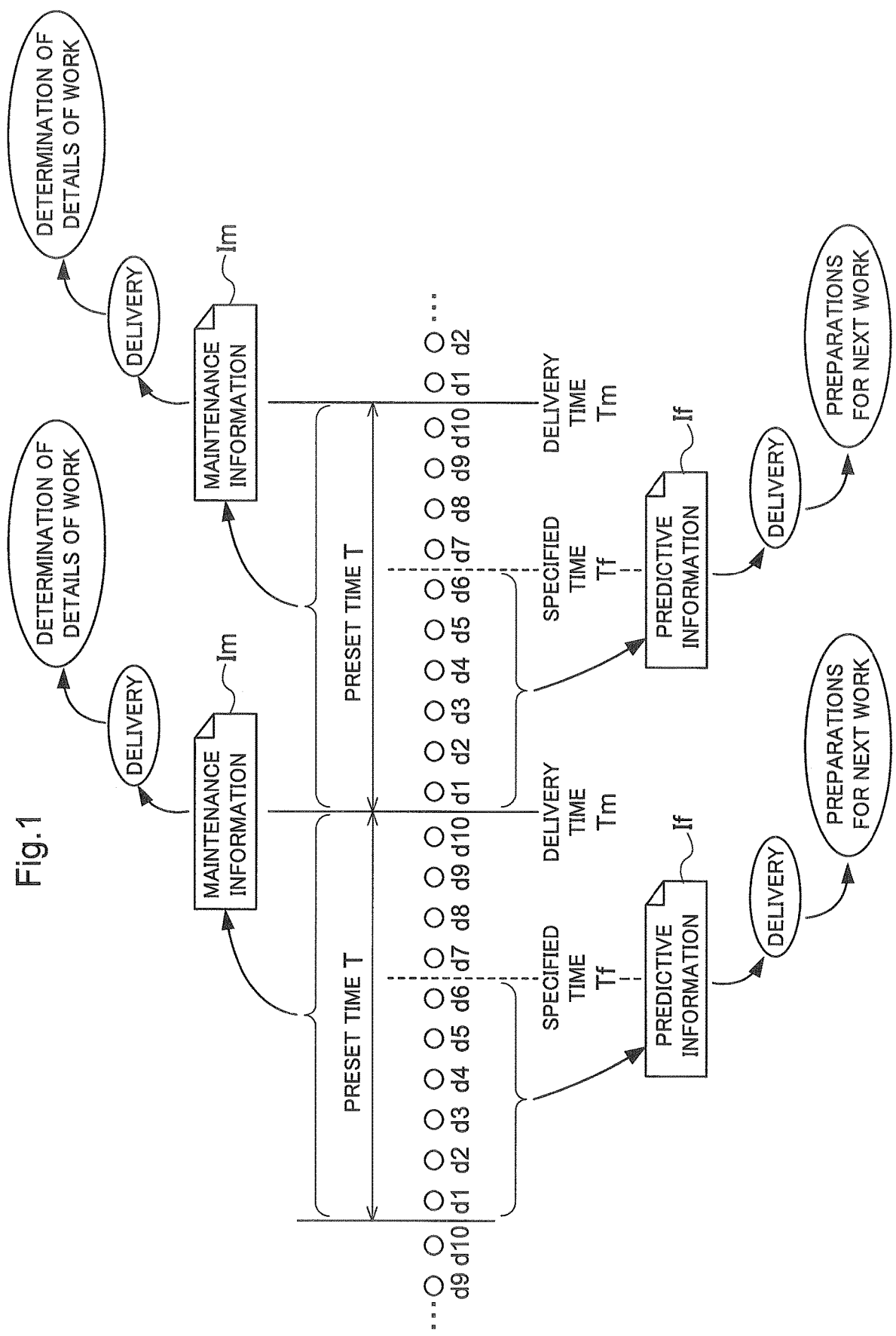
FIG. 1 is a diagram illustrating an overview of a maintenance support system according to the present embodiment.

First, an overview of the maintenance support system (and the maintenance support method) will be described based on the example shown in FIG. 1. This maintenance support system relates to maintenance of a plurality of maintenance-target apparatuses in a plant, and essentially the maintenance support system regularly delivers maintenance information Im that indicates the respective operational statuses of the maintenance-target apparatuses (statuses that specify which apparatus is in a bad state, for example) such that maintenance information Im can be used in maintenance work that is regularly performed on the maintenance-target apparatuses, and thus supports the maintenance work.

This maintenance support system is configured to deliver maintenance information Im every preset time T. Each maintenance-target apparatus is provided with a detector that detects the state of the maintenance-target apparatus corresponding thereto, and the detector intermittently detects the state of the maintenance-target apparatus. Note that the state detection is performed a plurality of times during the preset time T (for example, ten times in FIG. 1). Then, based on the detection signals, determination results dn, which are the results of determination regarding the state of a maintenance-target apparatus (for example, d1 to d10 in FIG. 1), are respectively generated for the detection signals. That is, the same number of determination results as the number of times the detection is performed by a detector (for example, ten determination results in FIG. 1) are generated during each preset time T.

In the maintenance support system, upon the preset time T elapsing and a delivery time Tm of maintenance information Im being reached, maintenance information Im that indicates the respective operational statuses of the maintenance-target apparatuses is generated based on statistics regarding the determination results generated during the preset time T (for example, ten determination results in FIG. 1), and is delivered to maintenance personnel. Maintenance personnel confirm the details of maintenance work to be performed, based on this maintenance information.

Furthermore, the maintenance support system is configured to deliver predictive information If to maintenance personnel at a specified time Tf between the previous delivery of maintenance information and the next delivery of maintenance information. The predictive information If provides predictions regarding the operational status of each maintenance-target apparatus at the next delivery of maintenance information.

Specifically, upon the specified time Tf being reached, predictive information If that indicates the state of each maintenance-target apparatus is generated based on statistics regarding the determination results generated during the period from the previous delivery of maintenance information to the specified time Tf (e.g. six determination results in FIG. 1), and is delivered to maintenance personnel. Maintenance personnel can prepare for the next maintenance work to be performed, based on this predictive information If.

As described above, in this maintenance support system, the details of maintenance work to be performed are confirmed based on maintenance information Im in which the previous determination results are also taken into consideration, and thus accurate maintenance work is performed. Also, it is possible to efficiently prepare for maintenance work that requires a certain amount of time for the allotment of workers and the preparation of replacement parts, based on the predictive information If that is delivered prior to the maintenance information Im, while reducing unnecessary elements in terms of workers and replacement parts.

The following describes an example of a maintenance support system for a steam plant, in which the maintenance-target apparatuses are a large number of steam traps that are installed in sections of the steam plant, and maintenance work is performed on defective steam traps on a daily basis.

Figure 2:
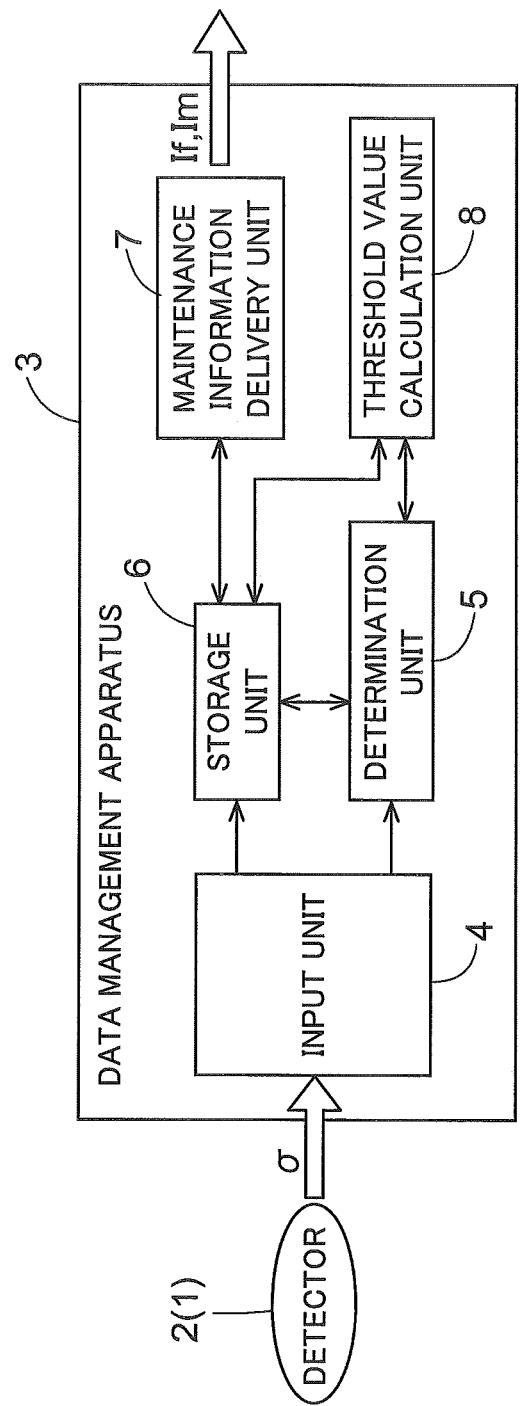
FIG. 2 is a block diagram for the maintenance support system according to the present embodiment.

As shown in FIG. 2, the maintenance support system includes: detectors 2 that are respectively installed on steam traps 1, which are the maintenance-target apparatuses, to detect the state (temperature and ultrasonic waves) of each steam trap 1; and a data management apparatus 3 configured to deliver maintenance information, which indicates the respective operational statuses of the maintenance-target apparatuses, to maintenance personnel every preset time (every day in the present embodiment) based on detection signals from the detectors 2.

The detectors 2 are each configured to intermittently detect the state of a steam trap 1 a plurality of times during the preset time (one day). For example, in the present embodiment, the detectors 2 are set to detect the state of a steam trap 1 once every hour. Each time detection is performed, the detectors 2 transmit a detection signal to the data management apparatus 3 using a communication means (not shown). In this way, the detectors 2 intermittently detect the state of a steam trap 1, and thus power consumption is suppressed and costs are reduced. Note that each detector 2 is configured to transmit identification information regarding the steam trap 1 on which the detector 2 is installed, to the data management apparatus 3, as well as a detection signal. It is not essential that the detectors 2 detect the temperature and ultrasonic waves of a steam trap, and the detectors 2 need only detect one or more physical amounts regarding a steam trap 1.

The data management apparatus 3 includes: an input unit 4 to which detection signals from the detectors 2 are input; a determination unit 5 configured to generate determination results, which are the results of determination regarding the state of each steam trap 1, based on the input detection signals; a storage unit 6 configured to cumulatively store therein the determination results generated by the determination unit 5; a maintenance information delivery unit 7 configured to generate maintenance information based on the determination results that have been cumulatively stored in the storage unit 6, and deliver the maintenance information to maintenance personnel every preset time; and a threshold value calculation unit 8 configured to calculate a normal range (described later), using a predetermined calculation reference.

The determination unit 5 determines the state of each steam trap 1 based on the input detection signals. More specifically, the determination unit 5 determines whether a steam trap 1 is in a normal state, a bad state, or a state indicating an inclination toward a bad state (i.e. a state that is not a bad state, but is highly likely to change to a bad state) from a state value (the temperature and ultrasonic waves of the steam trap 1 in the present embodiment) that is based on a detection signal. Upon determining that a steam trap 1 is in a bad state, the determination unit 5 also examines, for example, whether or not a steam apparatus that relates to the steam trap is operating, to determine whether the steam trap 1 itself is in a bad state, or the steam trap 1 is not in a bad state, but in a suspended state (a suspended state or the like due to causes other than a malfunction). The determination unit 5 performs determination to generate a determination result regarding the state of each steam trap 1, for each input detection signal.

Here, the state value is a concept that includes not only a value that indicates a given physical amount (e.g. temperature, ultrasonic waves, or pressure) detected by a detector 2, but also a value that indicates a combination of a plurality of detected physical amounts (e.g. a value obtained by totalling a plurality of weighted physical amounts). Also, it is not essential that only one state value is subjected to determination, and determination may be performed on a plurality of state values, or on a combination of the value and the inclination of a state value.

The determination results obtained by the determination unit 5 are stored in the storage unit 6 in association with the identification information regarding the steam trap 1 corresponding thereto. Each time a detection signal regarding a steam trap 1 is newly input from a detector 2, the storage unit 6 cumulatively stores a determination result that is based on the detection signal. As a result, the determination results regarding all of the maintenance-target steam traps 1 are cumulatively stored in the storage unit 6 in chronological order.

The maintenance information delivery unit 7 delivers maintenance information that indicates the respective operational statuses of the steam trap 1 to maintenance personnel every preset time, as described above. The maintenance information is generated from determination results that are based on detection signals detected during a preset time, and more specifically, the maintenance information is generated based on statistics regarding determination results obtained during a preset time. Maintenance information thus generated is delivered to maintenance personnel.

The following specifically describes the generation of maintenance information. First, in the present embodiment, the preset time is set to one day (twenty-four hours), and maintenance information is set to be generated and delivered to maintenance personnel at 8:00 AM every day. In this case, the maintenance information delivery unit 7 generates maintenance information at 8:00 AM every day.

The maintenance information delivery unit 7 generates maintenance information based on the determination results that have been cumulatively stored in the storage unit 6.

More specifically, first, for each steam trap 1, the maintenance information delivery unit 7 extracts determination results corresponding to twenty four points in time, regarding the detection signals detected by a detector 2 during a period from the previous delivery of maintenance information to the present time (e.g. during twenty-four hours). Then, the maintenance information delivery unit 7 determines that the steam trap 1 is in a state that is most frequently indicated by the determination results corresponding to twenty-four points in time, out of the four states, namely a normal state, a bad state, a state indicating an inclination toward a bad state, and a suspended state or the like. The same determination is performed on each steam trap 1, and the states of all of the maintenance-target steam traps 1 are determined.

Then, the maintenance information delivery unit 7 generates maintenance information as shown in FIG. 3 based on the states of all of the steam traps 1. The maintenance information includes: a summary field, which shows the number of maintenance targets, and a breakdown indicating the number of locations in a bad state and the number of locations in a suspended state; and a detail field, which shows, for example, the details of locations in a bad state and the details of locations where the state indicates an inclination toward a bad state. In the summary field, values in the previous maintenance information are shown in parentheses so that comparisons can be made with those from the previous day. The determination results are based on the detection signals from the detectors 2, and are not results that are visually confirmed. Therefore, whether or not the determination results have been visually confirmed is also shown. The detail field shows the product type and positional information of a steam trap 1 regarding each of the locations in a bad state and each of the locations where the state indicates an inclination toward a bad state, and locations where preparations for trap replacement are required, as the details of maintenance work that is to be performed. Note that the detail field may show not only the locations where preparations for trap replacement are required, but also various kinds of maintenance work such as cleaning of the steam trap 1, replacement of the detector 2, replacement of the battery of the detector 2, and recovery of communication between the detector 2 and the data management apparatus 3. In this way, maintenance information includes the number of steam traps 1 in a bad state (and a state indicating an inclination toward a bad state, and a suspended state) out of maintenance-target steam traps 1, the product type and positional information of the steam traps 1 in a bad state (and a state indicating an inclination toward a bad state), and the details of maintenance work that is to be performed on the maintenance-target steam traps 1.

The created maintenance information is delivered to terminals such as personal computers of maintenance personnel via e-mail. Based on this maintenance information, maintenance personnel replaces a steam trap 1 that has been determined as being in a bad state, and repair a steam trap 1 that has been determined as being in a state indicating an inclination toward a bad state, if possible.

In this maintenance support system, the maintenance information delivery unit 7 is configured to deliver, in addition to maintenance information, predictive information that provides predictions regarding the operational status of each maintenance-target apparatus at the next delivery of maintenance information, to maintenance personnel. This predictive information is delivered at a specified time between the previous delivery of maintenance information and the next delivery of maintenance information. This predictive information is generated from determination results that are based on detection signals detected between the previous delivery of maintenance information and the specified time, and more specifically, the predictive information is generated based on statistics regarding determination results obtained between the previous delivery of maintenance information and the specified time.

The following specifically describes the delivery of predictive information. First, in the present embodiment, maintenance information is set to be generated and delivered to maintenance personnel at 8:00 AM every day, but 16:00 PM is set to the specified time at which predictive information is delivered. In this case, the maintenance information delivery unit 7 generates predictive information at 16:00 PM every day.

Basically, predictive information is generated in the same manner as the maintenance information. That is, maintenance information is generated based on the determination results that have been cumulatively stored in the storage unit 6. More specifically, for the steam traps 1, the maintenance information delivery unit 7 extracts determination results corresponding to eight points in time, regarding the detection signals detected by the detectors 2 during a period from the previous delivery of maintenance information to the present time (16:00 PM) (i.e. during eight hours). Then, the maintenance information delivery unit 7 predicts that the state of the steam trap 1 will be the state that is most frequently indicated by the determination results, out of the four states, namely a normal state, a bad state, a state indicating an inclination toward a bad state, and a suspended state or the like. The same is performed on each steam trap 1, and predictions regarding the states of all of the maintenance-target steam traps 1 are provided.

Then, based on the states of all of the steam traps 1, predictive information If is created as shown in FIG. 4, where the predictive information If includes: a summary field, which shows the number of maintenance targets, and a breakdown indicating the number of locations in a bad state and the number of locations in a suspended state; and a detail field, which shows the details of the locations in a bad state (the detail field may also show the details of the locations where the state indicates an inclination toward a bad state). In the summary field, values in the previous maintenance information are shown in parentheses so that comparisons can be made with those from the previous day. The determination results are based on the detection signals from the detectors 2, and are not results that are visually confirmed. Therefore, whether or not the determination results have been visually confirmed is also shown. The detail field shows the product type and positional information of each of the steam traps 1 at the locations in a bad state. Note that predictive information may also include maintenance work that is to be performed on maintenance-target steam traps 1, as with maintenance information.

The created predictive information is delivered to terminals such as personal computers of maintenance personnel via e-mail. Then, based on this predictive information, maintenance personnel estimate the number of man-hours, the number of workers, the number and type of replacement traps, and tools that are required for the next maintenance work to be performed, and prepare for the maintenance work.

As a result, while maintenance information for maintenance work is delivered, predictive information that provides predictions regarding the operational statuses of the maintenance-target apparatuses is delivered to maintenance personnel, prior to the delivery of maintenance information for maintenance work. Therefore, maintenance personnel can estimate the number of man-hours, the number of workers, the number and type of replacement traps, and tools that are required for the next maintenance work to be performed, in advance. Thus, it is possible to make efficient preparations with reduced unnecessary elements in terms of workers and traps, by avoiding having unnecessary workers or preparing unnecessary replacement traps. Therefore, it is possible to make efficient preparations for maintenance work by delivering predictive information, while ensuring accurate maintenance work by delivering maintenance information.

Next, the above-described determination performed by the determination unit 5 will be more specifically described. As described above, the determination unit 5 determines whether the state of each steam trap 1 is a normal state, a bad state, or a state indicating an inclination toward a bad state (or a suspended state or the like, which is omitted here), based on the temperature and ultrasonic waves of the steam trap 1. More specifically, threshold values are respectively provided for the temperature and the ultrasonic waves, and the determination unit 5 determines whether the state is a normal state, a state indicating an inclination toward a bad state, or a bad state, based on the threshold values. The following describes a threshold value setting system according to the present embodiment and a threshold value setting method employed therein.

Threshold Value Setting Method

Generally, to determine the state of a steam trap 1, an upper limit value, a lower limit value, or both are set as a state value (a value indicating the state of a steam trap 1 such as a physical amount such as the temperature or ultrasonic waves or the like) of the determination target, regardless of the purpose of the steam trap 1 (e.g. the type of apparatus or facility where the trap 1 is installed in relation thereto, and the pressure and temperature of steam employed in a plant), and the state is determined as being a bad state if a determination-target state value is higher than the upper limit value or lower than the lower limit value. Here, the upper limit value and the lower limit value are referred to as an acceptable upper limit value tu and an acceptable lower limit value t1, and a range above the acceptable upper limit value tu and a range below the acceptable lower limit value t1 are referred to as bad ranges.

Note that determination-target state values are not constant and vary over time even if a steam trap 1 is in a normal state. The range of values that can be taken when a steam trap 1 is in a normal state is referred to as a normal range. The upper limit value and the lower limit value of the normal range (referred to as a normal upper limit value nu and a normal lower limit value n1) are different from the acceptable upper limit value tu and the acceptable lower limit value t1, and exist between the acceptable upper limit value tu and the acceptable lower limit value t1. There are no problems when the determination-target state value falls within the normal range. However, it can be said that, when the determination-target state value is out of the normal range, even if the determination-target state value is not in a bad range, the state of the steam trap 1 is highly likely to change to a bad state.

That is, if warning ranges are defined between the normal range and bad ranges (e.g. the range between the acceptable upper limit value tu and the normal upper limit value nu, and the range between the normal lower limit value n1 and the acceptable lower limit value t1 in FIG. 5), there are warning ranges of the determination-target state value in addition to the normal range corresponding to cases where the steam trap 1 is in a normal state and the bad ranges corresponding to cases in which the steam trap 1 is determined as being in a bad state. It can be said that, if the determination-target state value is in a warning range, the state value is highly likely to enter a bad range, i.e. the steam trap 1 is highly likely to enter a bad state.

Based on such an idea, the determination unit 5 sets the acceptable upper limit value tu, the acceptable lower limit value t1, the normal upper limit value nu, and the normal lower limit value n1 for each of the temperature and ultrasonic wave values, and determines that the steam trap 1 is in a normal state if the temperature and ultrasonic wave values fall within a normal range, determines that the steam trap 1 is in a state indicating an inclination toward a bad state if the temperature and ultrasonic wave values fall within a warning range, and determines that the steam trap 1 is in a bad state if the temperature and ultrasonic wave values fall within a bad range.

However, as described above, there is a problem in which the normal upper limit value nu and the normal lower limit value n1 change according to the purpose of a steam trap 1, while the acceptable upper limit value tu and the acceptable lower limit value t1 are constant regardless of the purpose of a steam trap 1. Therefore, it is necessary to set the normal upper limit value nu and the normal lower limit value n1, i.e. the normal range, for each target steam trap 1.

Considering such a problem, the maintenance support system according to the present embodiment includes the following configuration that serves as a threshold value calculation system for setting a normal range. That is, the determination unit 5 is configured to perform bad state determination based on detection signals from a detector 2 to determine whether a steam trap 1 is in a normal state or a bad state. Here, the bad state determination is performed based on whether or not state values that are based on detection signals from a detector 2 are in a bad range of the state values (whether or not the state values have exceeded the acceptable upper limit value tu, or whether or not the state values have fallen below the acceptable lower limit value t1). The storage unit 6 is configured to cumulatively store the determination-target state value and the determination result regarding the bad state determination. Then, the threshold value calculation unit 8 is configured to calculate a normal range (i.e. the normal upper limit value nu and the normal lower limit value n1) using a predetermined calculation reference, based at least on state values with normal determination results from among state values stored in the storage unit 6 during a predetermined period.

That is, in the maintenance support system, in order to calculate a normal range, the determination unit 5 is caused to perform bad state determination based on detection signals obtained by the detectors 2, and the storage unit 6 cumulatively stores determination-target state values and determination results of the bad state determination. Thus, the determination-target state values of each steam trap 1 and the determination results of the bad state determination regarding the state values have been cumulatively stored in the storage unit 6 since a point in time in the past. Then, the threshold value calculation unit 8 calculates the normal upper limit value nu and/or the normal lower limit value n1 of a normal range using a predetermined calculation reference, based on detection values with normal results regarding bad state determination, from among the detection values that have been cumulatively stored during a predetermined period. For example, a normal range is calculated using an average value $\mu$ and a standard deviation $\sigma$ of state values stored during a predetermined period, a coefficient r, which is a positive integer number, is set as the calculation reference, and $\mu \pm r \cdot \sigma$ is calculated as the normal upper limit value nu and/or the normal lower limit value n1 of the normal range.

This maintenance support system is configured such that the accuracy of determination (predictive determination) using the normal range calculated by the threshold value calculation unit 8 is then determined, and if the accuracy is not sufficient, the above-described calculation reference is adjusted and an appropriate normal range is set again.

Specifically, in the maintenance support system, the determination unit 5 is configured to perform predictive determination to determine whether a steam trap 1 is in a normal state or a state indicating an inclination toward a bad state, based on whether or not the state value is in a normal range, and the determination unit 5 performs predictive determination on the state values stored in the storage unit 6, including detection values not used for normal range calculation. Then, the threshold value calculation unit 8 performs accuracy determination to determine the accuracy of predictive determination based on the results of predictive determination, and adjusts the above-described calculation reference based on the result of accuracy determination.

Specifically, accuracy determination is performed by comparing the results of the predictive determination regarding the state values, with the results of bad state determination regarding state values that have been obtained during a predetermined period after the state values on which the predictive determination has been performed were detected, to determine whether the predictive determination is correct or incorrect. Whether predictive determination is correct or incorrect is determined as shown in Table 1 below.

TABLE 1

|  | Predictive Determination = Normal | Predictive Determination = Bad |
|---|---|---|
| Subsequent Bad State Determination = Normal | Correct (Case A) | Incorrect (Case C) |
| Subsequent Bad State Determination = Bad | Incorrect (Case B) | Correct (Case D) |

That is, as shown in Table 1, when a predictive determination result is normal, if bad state determination results obtained during a predetermined period thereafter remain normal (Case A), it is determined that the predictive determination is correct, and if bad state determination results obtained during a predetermined period thereafter show a change to a bad state (Case B), it is determined that the predictive determination is incorrect. Also, when a predictive determination result is a state indicating an inclination toward a bad state, if bad state determination results obtained during a predetermined period thereafter remain normal (Case C), it is determined that the predictive determination is incorrect, and if bad state determination results obtained during a predetermined period thereafter show a change to a bad state (Case D), it is determined that the predictive determination is correct.

Then, the threshold value calculation unit 8 summarizes all of the correctness determination results of the above-described predictive determination regarding the state values stored in the storage unit 6, calculates the ratio of cases in which the result of predictive determination was incorrect relative to the results of summarization, and determines whether or not the accuracy is sufficient by determining whether the ratio is higher than or lower than a predetermined value. Upon determining that the accuracy is sufficient (the ratio is lower than the predetermined value), the threshold value calculation unit 8 confirms the calculated normal upper limit value nu and/or normal lower limit value n1 as the threshold value(s) for the predictive determination performed by the determination unit 5. In contrast, upon determining that the accuracy is not sufficient (the ratio is higher than the predetermined value), the threshold value calculation unit 8 adjusts the coefficient r to calculate a new normal range (the normal upper limit value nu and the normal lower limit value n1), and performs accuracy determination again using the new normal range, and repeatedly adjusts the coefficient r until it is determined that the accuracy is sufficient.

Here, as described above, cases of incorrect predictive determination are composed of cases in which a bad state could not be predicted (Case B) and cases in which a state indicating an inclination toward a bad state was determined, leading to unnecessary countermeasures (Case C). It is desirable that the coefficient r is adjusted such that both the frequency of Case B and the frequency of Case C are the smallest. However, if the coefficient r is adjusted such that the frequency of Case B is reduced, although the frequency of cases in which a bad state could not be predicted is reduced, it is more likely that a steam trap in a normal state is determined as being in a state indicating an inclination toward a bad state, and the frequency of Case C increases. In contrast, if the coefficient r is adjusted such that the frequency of Case C is reduced, although the frequency of cases in which a steam trap in a normal state is determined as being in a state indicating an inclination toward a bad state is reduced, it is more likely that a bad state will be predicted, and the frequency of Case B increases. In this way, it is impossible to reduce both the frequency of Case B and the frequency of Case C to be the smallest, and the coefficient r needs to be adjusted from a viewpoint regarding which out of Case B and Case C should be given greater importance, for example.

Therefore, the threshold value calculation unit 8 is configured to perform accuracy determination based on: a first index $\alpha$ that indicates the ratio, relative to all of the results of correctness determination regarding predictive determination, of cases in which the result of predictive determination indicates a normal state, and the results of bad state determination regarding state values obtained during the predetermined period thereafter include a result determined as indicating a bad state (Case B); a second index $\beta$ that indicates the ratio, relative to all of the results of correctness determination regarding predictive determination, of cases in which the result of predictive determination indicates a state indicating an inclination toward a bad state, and the results of bad state determination regarding state values obtained during the predetermined period thereafter do not include a result determined as indicating a bad state (Case C); or a third index $\gamma$ (e.g. $\alpha+\beta$) that is a combination of the first index $\alpha$ and the second index $\beta$.

The first index $\alpha$ indicates the ratio of cases in which a bad state could not be predicted, and the second index $\beta$ indicates the ratio of cases in which a steam trap that will be in a normal state was determined to be in a state indicating an inclination toward a bad state and unnecessary countermeasures will be performed. The third index $\gamma$ indicates the ratio of all of the cases of incorrect predictive determination. That is, accuracy determination is performed to (1) reduce cases in which a bad state could not be predicted (based on the first index $\alpha$), (2) reduce cases in which unnecessary countermeasures will be performed (based on the second index β), or (3) reduce the number of cases of incorrect predictive determination (based on the third index γ).

Furthermore, this maintenance support system is configured such that an instruction that indicates the purpose of accuracy determination, out of (1) to (3) above, is input to the input unit (corresponding to the instruction input unit) 3 for each steam trap 1, and the threshold value calculation unit 8 switches between the first index α, the second index β, and the third index γ, based on which the accuracy determination is performed on each steam trap 1, based on the instruction from the input unit 3.

If accuracy determination is performed for the purpose (1) above (to reduce cases in which a bad state could not be predicted), the threshold value calculation unit 8 only focuses on the first index α in accuracy determination, and adjusts the coefficient r until it is determined that the accuracy is sufficient, where the threshold value calculation unit 8 is configured to determine that the accuracy is sufficient when the first index α is smaller than or equal to a given value. If accuracy determination is performed for the purpose (2) above (to reduce cases in which unnecessary countermeasures will be performed), the threshold value calculation unit 8 only focuses on the second index β in accuracy determination, and adjusts the coefficient r until it is determined that the accuracy is sufficient, where the threshold value calculation unit 8 is configured to determine that the accuracy is sufficient when the second index β is smaller than or equal to a given value. If accuracy determination is performed for the purpose (3) above (to reduce the number of cases of incorrect predictive determination), the threshold value calculation unit 8 only focuses on the third index γ in accuracy determination, and adjusts the coefficient r until it is determined that the accuracy is sufficient, where the threshold value calculation unit 8 is configured to determine that the accuracy is sufficient when the third index γ is smaller than or equal to a given value.

Note that the third index γ may be obtained not only by simply totalling the first index α and the second index β, but also by totalling the first index α and the second index β after assigning a weight to either one of them, and it is possible to determine the accuracy based on the sum. If this is the case, it is possible to perform flexible accuracy determination from a viewpoint regarding whether to reduce cases in which a bad state could not be predicted or to reduce cases in which unnecessary countermeasures will be performed, while considering the number of cases of incorrect predictive determination.

Figure 6:
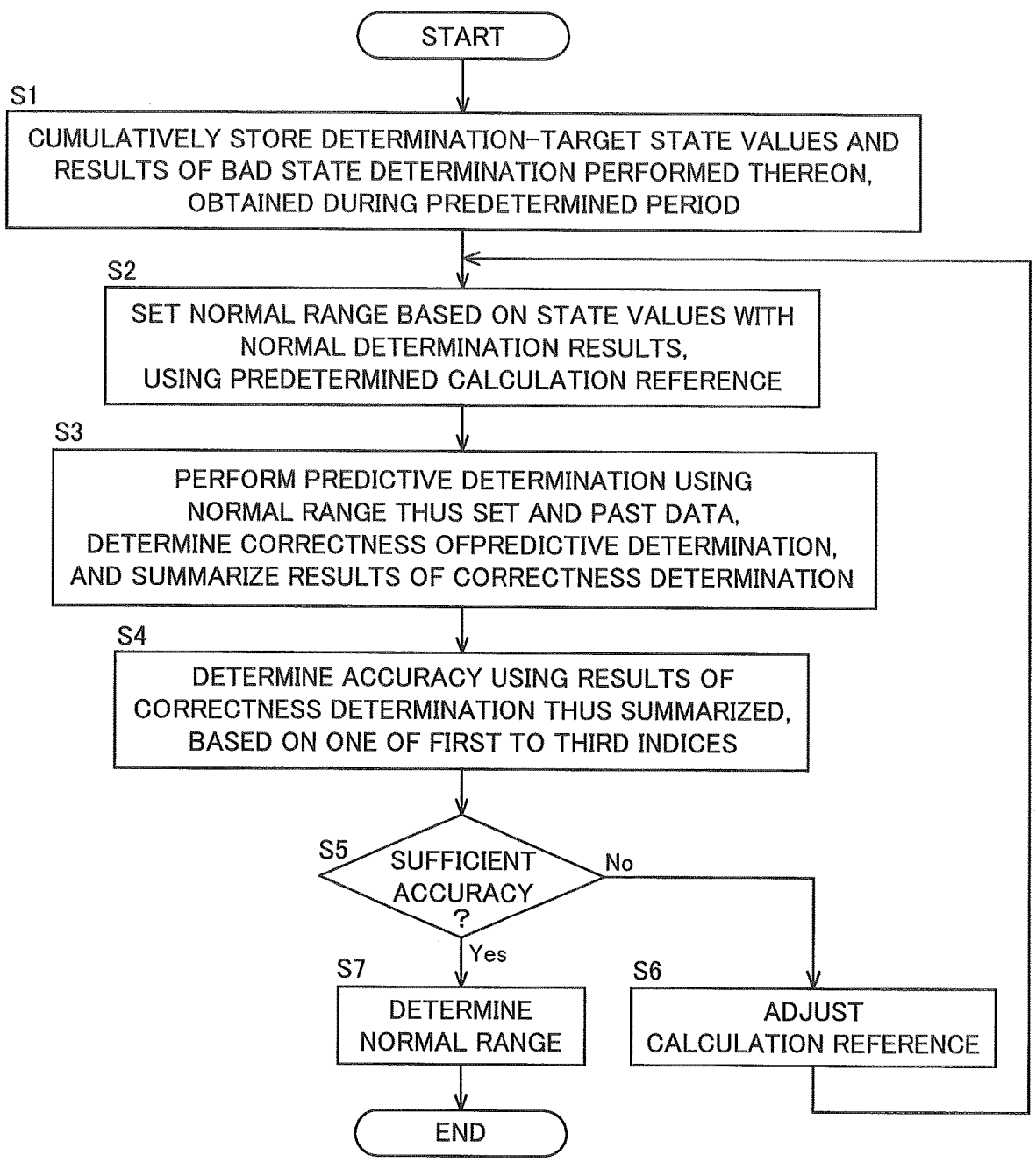
FIG. 6 is a flowchart showing an example of a procedure for determining a normal range.

The normal range is specifically set as shown in FIG. 6, for example. Here, it is assumed that the storage unit 6 cumulatively stores past data regarding each steam trap 1, i.e. the state values of the steam traps 1 detected by the detectors 2 during past operation of the plant, and the results of bad state determination performed thereon.

First, for each steam trap 1, the detection signals from the detector 2 are collected during a predetermined period, and the determination-target state values and the results of bad state determination performed thereon are cumulatively stored in the storage unit 6 (step S1). Upon the predetermined time elapsing, the threshold value calculation unit 8 sets a normal range based on state values with normal determination results, from among the state values that have been cumulatively stored (step S2).

Then, based on the normal range thus set, the determination unit 5 performs predictive determination on the state values of the steam traps 1, detected by the detectors 2 during past operation of the plant, and the threshold value calculation unit 8 determines whether the predictive determination is correct or incorrect by comparing the results of predictive determination with the results of bad state determination regarding state values that have been obtained during a predetermined period after the state values on which the predictive determination has been performed were detected (step S3). The threshold value calculation unit 8 summarizes the correctness determination results regarding the predictive determination, and performs accuracy determination based on one of the purposes shown in (1) to (3) above (i.e. one of the first to third indices α to γ) that has been set to the steam traps 1 (step S4).

If it is determined in this accuracy determination that the accuracy is not sufficient (step S5: No), the calculation reference (the coefficient r) for setting the normal range is adjusted (step S6), step S2 is performed again to set the normal range again, and steps S3 and S4 are repeated. If it is determined in this accuracy determination that the accuracy is sufficient (step S5: Yes), the normal range (the normal upper limit value nu and the normal lower limit value nl) thus set determines the threshold values for predictive determination (step S7).

In this way, the normal range is set (calculated) once, then accuracy determination for determining the accuracy of predictive determination that is based on this normal range is performed, and the calculation reference is adjusted based on the accuracy determination. Therefore, it is possible to adjust the calculation reference (coefficient r) for a steam trap 1 for which the accuracy of predictive determination is insufficient so that the accuracy becomes sufficient. Also, it is possible to switch between the first index, the second index, and the third index, based on which the accuracy determination is performed. Therefore, it is possible to switch the reference for accuracy determination according to the importance or purpose of the steam trap, and flexibly set the normal range according to a maintenance policy regarding steam traps. Thus, it is possible to appropriately set the normal range, and it is possible to perform accurate predictive determination on each steam trap 1.

As described above, in the maintenance support system according to the present embodiment, the normal upper limit value nu and the normal lower limit value nl are calculated and are determined as threshold values as described above, and the determination unit 5 determines the state of a steam trap 1 from among a normal state, a state indicating an inclination toward a bad state, and a bad state, using the normal upper limit value nu, the normal lower limit value nl, the acceptable upper limit value tu, and the acceptable lower limit value tl as threshold values (i.e. performs bad state determination and predictive determination). Then, based on the results of determination performed by the determination unit 5, the above-described maintenance information Im and predictive information If are generated and delivered, to support maintenance work to be performed on the steam trap 1.

OTHER EMBODIMENTS

Finally, other embodiments of the threshold value calculation system and the threshold value calculation method according to the present embodiment will be described. Note that the configurations disclosed in each of the embodiments below can be combined with configurations disclosed in another embodiment as long as no contradictions occur.

(i) The embodiment above describes an example of a configuration in which accuracy determination is performed by comparing the results of predictive determination that are based on the calculated normal range with the results of the subsequent bad state determination to determine the correctness of predictive determination, and such accuracy determination is performed using one of the first index α, the second index β, and the third index γ. However, embodiments of the present disclosure are not limited in such a manner, and any method may be employed as long as the accuracy of predictive determination can be determined.

(ii) The embodiment above describes an example of a configuration in which the threshold value calculation unit 8 is caused to calculate both the normal upper limit value nu and the normal lower limit value n1, and to determine both of them as threshold values for the determination unit 5, and the determination unit 5 performs determination using the normal upper limit value nu, the normal lower limit value n1, the acceptable upper limit value tu, and the acceptable lower limit value t1 as threshold values. However, embodiments of the present disclosure are not limited in such a manner. The threshold value calculation unit 8 may be caused to calculate only one of the normal upper limit value nu and the normal lower limit value n1, and to determine only one of them as a threshold value for the determination unit 5, and only the acceptable lower limit value t1 and the normal lower limit value n1, or only the acceptable upper limit value tu and the normal upper limit value n1 may be employed as threshold values.

(iii) The embodiment above describes an example of a configuration in which, for each steam trap 1, determination-target state values and the results of bad state determination corresponding thereto are cumulatively stored in the storage unit 6 for a predetermined period, the threshold value calculation unit 8 sets the normal range based on the state values for the predetermined period, predictive determination is performed using the past data stored in the storage unit 6, the correctness thereof is summarized, and the accuracy of predictive determination is determined based on the results of summarization. However, embodiments of the present disclosure are not limited in such a manner. For example, the threshold value calculation unit 8 may set the normal range based on past data that is already stored in the storage unit 6. Also, it is not essential that the storage unit 6 stores past data of each steam trap 1, and it is possible that predictive determination is performed using state values that are newly collected for each steam trap 1, the correctness of predictive determination is summarized, and the accuracy of predictive determination is determined based on the results of summarization.

(iv) Regarding other configurations, the embodiments disclosed in the present description are mere examples in all respects, and it should be understood that the scope of the present disclosure is not limited by the embodiments. It should be easy for a person skilled in the art to understand that it is possible to apply modifications as appropriate without departing from the spirit of the present disclosure. Therefore, as a matter of course, other embodiments that are modified without departing from the spirit of the present disclosure are included in the scope of the present disclosure.

INDUSTRIAL APPLICABILITY

The threshold value calculation system and the threshold value calculation method according to the present disclosure are applicable to calculation of threshold values that are used to determine the state of a steam trap.

DESCRIPTION OF REFERENCE SIGNS

1: F Steam Trap
2: Detector
4: Input Unit (Instruction Input Unit)
5: Determination Unit
6: Storage Unit
8: Threshold Value Calculation Unit

The invention claimed is:
1. A threshold value calculation system comprising:
a detector configured to detect one or more physical amounts regarding a steam trap, wherein the detector is installed on the steam trap and is configured to detect a temperature and ultrasonic waves of the steam trap;
a determination unit configured to perform bad state determination to determine whether the state of the steam trap is a normal state or a bad state by determining whether or not state values that are based on detection signals have come into a bad range of the state values;
a storage unit configured to cumulatively store the state values and determination results of the bad state determination; and
a threshold value calculation unit configured to calculate a normal range that is a range of values that are taken when the steam trap is in a normal state, by using a predetermined calculation reference, based at least on state values with normal determination results, from among the state values that have been stored in the storage unit during a predetermined period,
wherein the determination unit is configured to be able to perform predictive determination to determine that the steam trap is in a state that indicates an inclination toward a bad state when the state values are in a warning range, wherein the warning range is a range belonging to neither the normal range nor the bad range,
wherein the threshold value calculation unit is configured to perform accuracy determination to determine the accuracy of the predictive determination based on the results of the predictive determination regarding the state values stored in the storage unit, and adjust the calculation reference based on the result of accuracy determination,
wherein the threshold value calculation unit is configured to perform the accuracy determination by comparing the results of the predictive determination regarding the state values, with the results of bad state determination regarding state values that have been obtained during a predetermined period after the state values on which the predictive determination has been performed were detected, to determine whether the predictive determination is correct or incorrect, and
wherein the threshold value calculation unit is configured to perform the accuracy determination based on: a first index that indicates the ratio, relative to all of the results of correctness determination regarding predictive determination, of cases in which the result of predictive determination indicates a normal state, and the results of bad state determination regarding state values obtained during the predetermined period thereafter include a result determined as indicating a bad state; a second index that indicates the ratio, relative to all of the results of correctness determination regarding predictive determination, of cases in which the result of predictive determination indicates a state indicating an inclination toward a bad state, and the results of bad state determination regarding state values obtained during the predetermined period thereafter do not include a result indicating a bad state; or a third index that is a combination of the first index and the second index.

2. The threshold value calculation system according to claim 1, further comprising:
an instruction input unit, wherein the threshold value calculation unit is configured to switch between the first index, the second index, and the third index, based on which the accuracy determination is performed on each steam trap, based on an instruction from the instruction input unit.

3. A threshold value calculation method comprising:
detecting one or more physical amounts regarding a steam trap, wherein the detecting is performed by a detector installed on the steam trap, the detector being configured to detect a temperature and ultrasonic waves of the steam trap;
performing bad state determination to determine whether the state of the steam trap is a normal state or a bad state by determining whether state values that are based on detection signals have come into a bad range of the state values;
cumulatively storing state values and determination results of the bad state determination;
calculating a normal range that is a range of values that are taken when the steam trap is in a normal state, by using a predetermined calculation reference, based at least on state values with normal determination results, from among the state values that have been stored in the storage unit during a predetermined period;
performing predictive determination to determine that the steam trap is in a a state that indicates an inclination toward a bad state when the state values stored in the storage unit are in a warning range, wherein the warning range is a range belonging to neither the normal range nor the bad range; and
performing accuracy determination to determine the accuracy of the predictive determination based on the results of the predictive determination, and adjusting the calculation reference based on the result of accuracy determination,
wherein performing the accuracy determination comprises comparing the results of the predictive determination regarding the state values, with the results of bad state determination regarding state values that have been obtained during a predetermined period after the state values on which the predictive determination has been performed were detected, to determine whether the predictive determination is correct or incorrect, and
wherein performing the accuracy determination is based on: a first index that indicates the ratio, relative to all of the results of correctness determination regarding predictive determination, of cases in which the result of predictive determination indicates a normal state, and the results of bad state determination regarding state values obtained during the predetermined period thereafter include a result determined as indicating a bad state; a second index that indicates the ratio, relative to all of the results of correctness determination regarding predictive determination, of cases in which the result of predictive determination indicates a state indicating an inclination toward a bad state, and the results of bad state determination regarding state values obtained during the predetermined period thereafter do not include a result indicating a bad state; or a third index that is a combination of the first index and the second index.

* * * * *

UNITED STATES PATENT AND TRADEMARK OFFICE
CERTIFICATE OF CORRECTION

PATENT NO. : 10,928,004 B2
APPLICATION NO. : 15/564230
DATED : February 23, 2021
INVENTOR(S) : Yoshiyasu Fujiwara et al.

Page 1 of 1

It is certified that error appears in the above-identified patent and that said Letters Patent is hereby corrected as shown below:

In the Claims

Column 19, Line 32, Claim 3, delete "a a" and insert -- a --

Signed and Sealed this
Thirteenth Day of July, 2021

Drew Hirshfeld
*Performing the Functions and Duties of the*
*Under Secretary of Commerce for Intellectual Property and*
*Director of the United States Patent and Trademark Office*